United States Patent [19]

Kalmanash

[11] Patent Number: 5,082,354
[45] Date of Patent: Jan. 21, 1992

[54] OPTICAL SWITCH AND COLOR SELECTION ASSEMBLY

[75] Inventor: Michael H. Kalmanash, Los Altos, Calif.

[73] Assignee: Kaiser Aerospace and Electronics Corporation, Foster City, Calif.

[21] Appl. No.: 400,156

[22] Filed: Aug. 29, 1989

[51] Int. Cl.$^5$ .............................................. G02F 1/43
[52] U.S. Cl. ..................... 350/339 F; 359/70; 359/93
[58] Field of Search ........... 350/339 F, 331 R, 347 E, 350/335, 338

[56] References Cited

U.S. PATENT DOCUMENTS

| | | | |
|---|---|---|---|
| 3,679,290 | 7/1972 | Adams et al. | 350/352 |
| 3,711,181 | 7/1973 | Adams et al. | 350/352 |
| 4,478,494 | 10/1984 | Soref | 350/347 E |
| 4,674,841 | 6/1987 | Buzak | 350/347 E |
| 4,726,660 | 2/1988 | Rushford | 350/347 E |
| 4,726,663 | 2/1988 | Buzak | 350/347 E |
| 4,758,818 | 7/1988 | Vatne | 350/335 |
| 4,770,500 | 9/1988 | Kalmanash et al. | 350/347 E |
| 4,913,529 | 4/1990 | Goldenberg et al. | 350/331 R |

FOREIGN PATENT DOCUMENTS 0125841 11/1984 European Pat. Off. ......... 350/347 E

OTHER PUBLICATIONS

James Adams et al., Cholesteric Films as Optical Filter Journal of Applied Physics, vol. 42, No. 10.

Primary Examiner—Michael C. Wimer
Assistant Examiner—Tan Ho
Attorney, Agent, or Firm—Marvin H. Kleinberg; Bruce M. Canter

[57] ABSTRACT

An apparatus and method for providing optical switching or color selection capability uses cholesteric liquid crystals which reflect and transmit circularly polarized light and a variable wave retarder element together with phase reversing mirrors which recapture and recombine the reflected circularly polarized light. With the retarder element in a first state, first orientation circularly polarized light is completely transmitted and second orientation circularly polarized light is redirected. Alternatively, a color selection assembly is provided through the use of a combination of cholesteric light crystals in which light of a first color is given a first polarization orientation and light of a second color is given a second polarization orientation. Depending upon the state of the retarder either the first or second color is transmitted to a desired target.

23 Claims, 6 Drawing Sheets

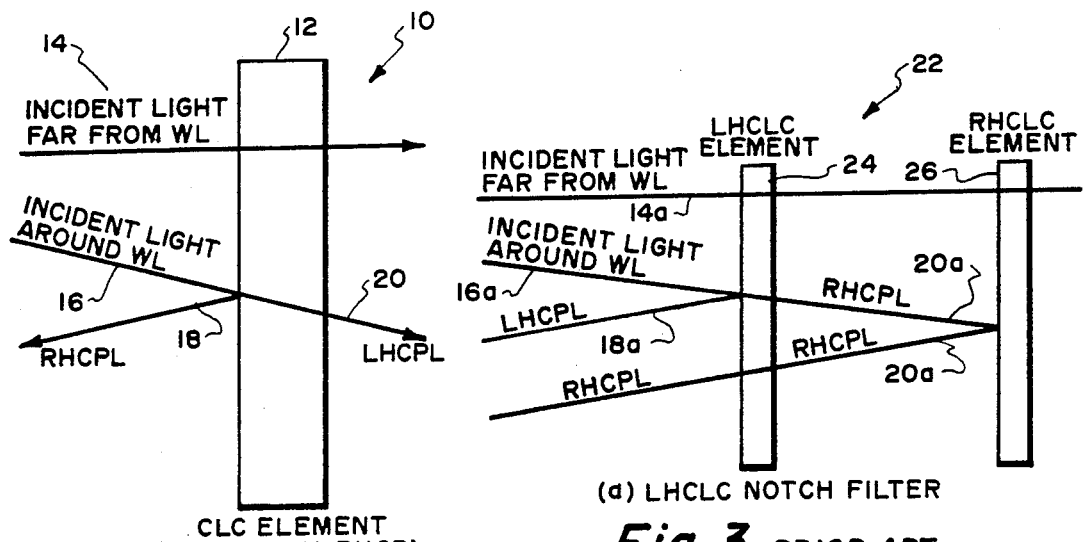
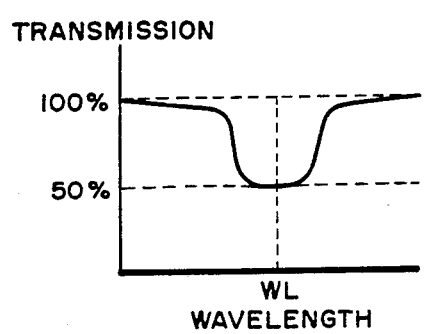
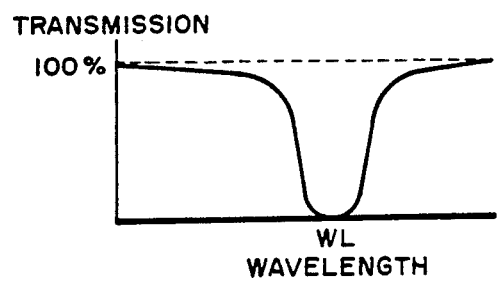
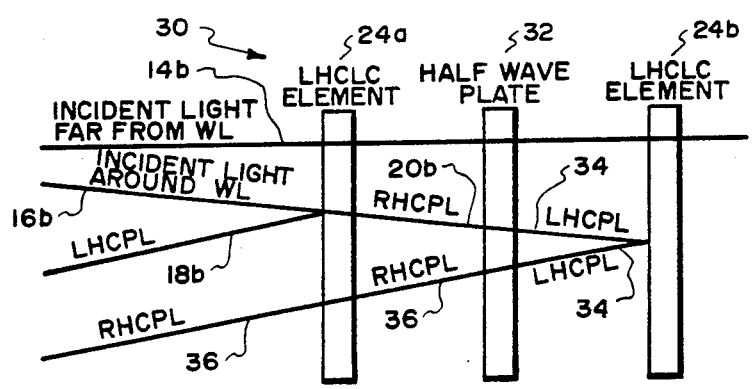

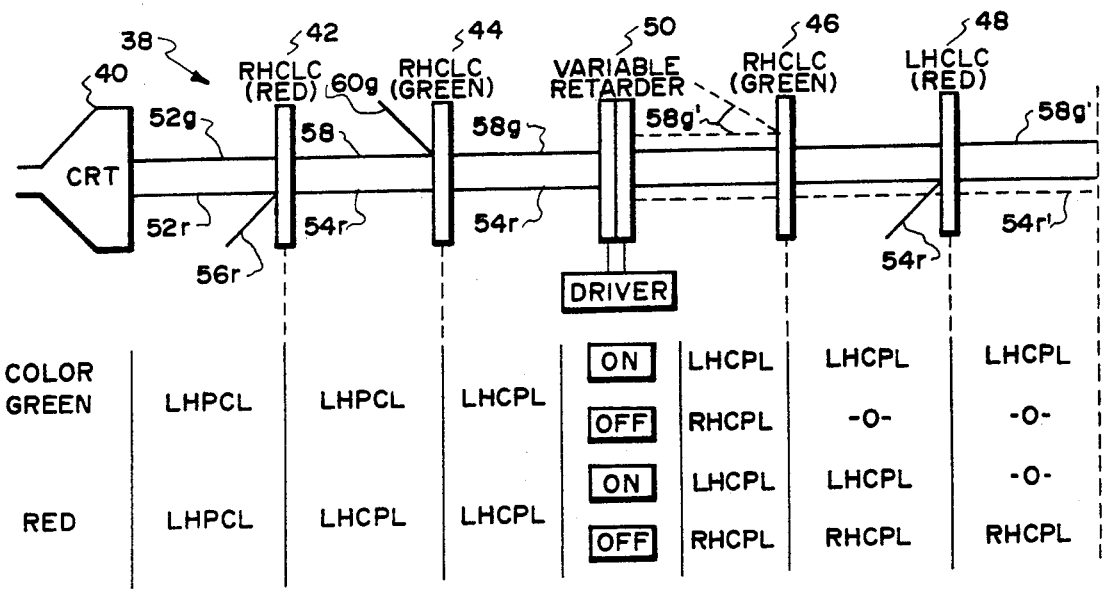
Fig. 6. PRIOR ART
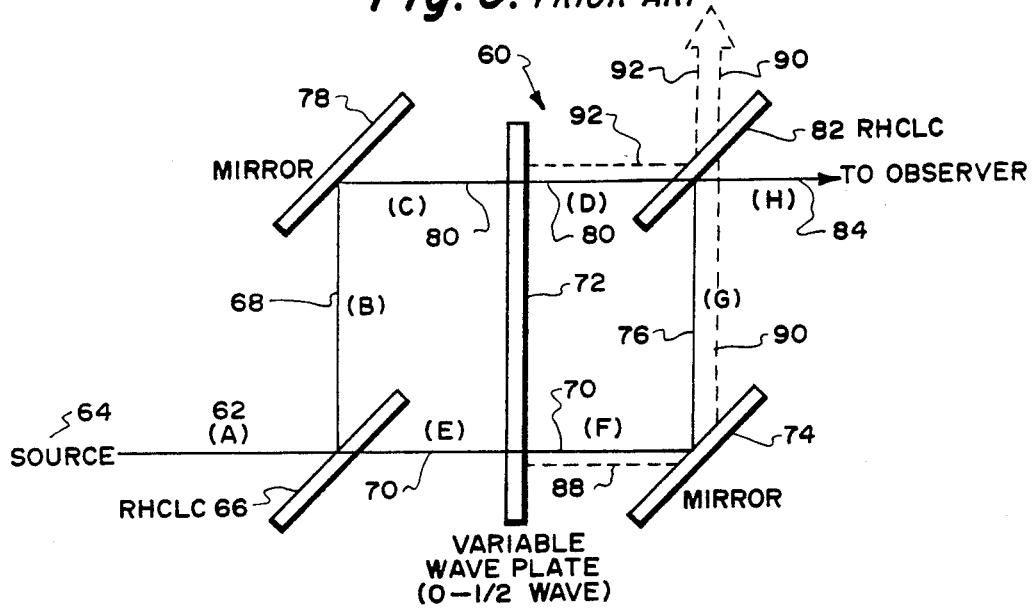
Fig. 7.
| RETARDER STATE | A | B | C | D | E | F | G | H |
|---|---|---|---|---|---|---|---|---|
| ZERO | 100% | RH | LH | LH | LH | LH | RH | 100% |
| HALFWAVE | 100% | RH | LH | RH | LH | RH | LH | -0- |
Fig. 8.

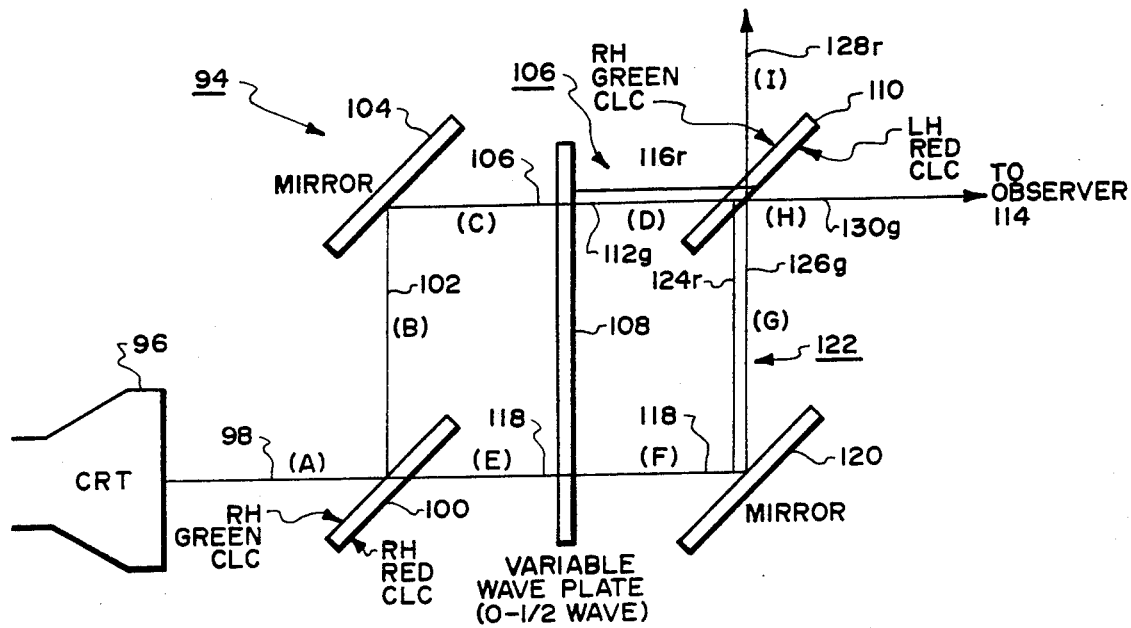
*Fig. 9on.*
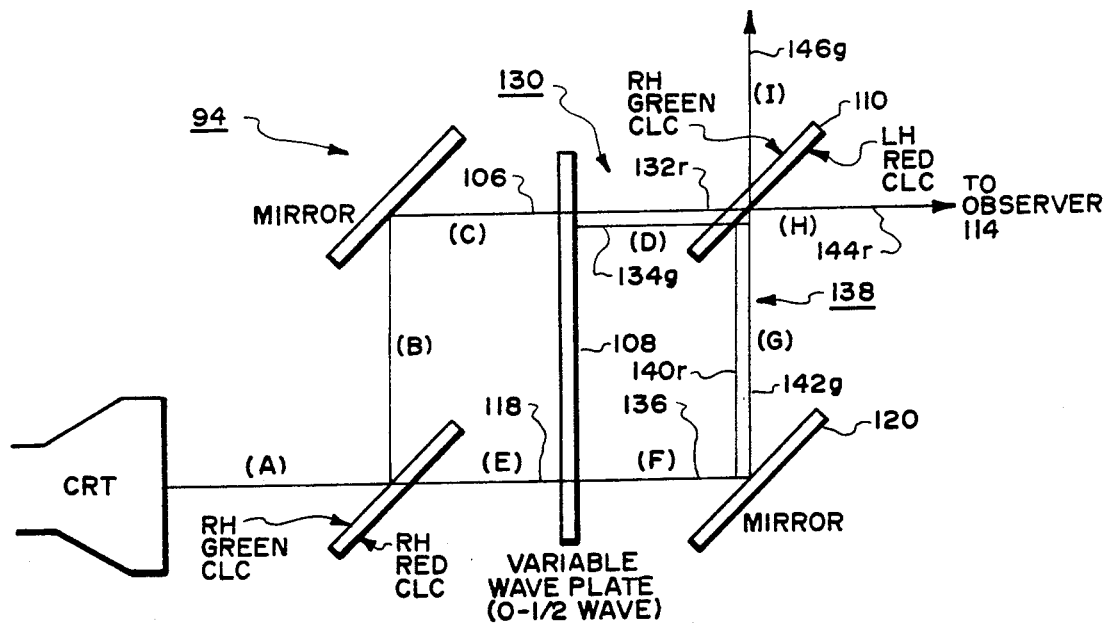
*Fig. 9off.*

| $\pi_1$ | $\pi_2$ | | B | C | C₁ | C₂ | D | E | E₁ | E₂ | F | G | H |
|---|---|---|---|---|---|---|---|---|---|---|---|---|---|
| OFF | OFF | R | RH | LH | RH | RH | LH | LH | RH | RH | LH | RH | -O- |
| | | G | RH | LH | RH | -O- | -O- | LH | RH | -O- | -O- | -O- | -O- |
| | | B | RH | LH | RH | RH | LH | LH | RH | RH | LH | RH | 100% |

OPTICAL SWITCH AND COLOR SELECTION ASSEMBLY

BACKGROUND OF THE INVENTION

The present invention relates to a method and apparatus for providing optical switching and, more particularly to a liquid crystal assembly for selectively transmitting colored illumination.

Current optical switching devices typically employ materials which absorb a significant amount of light, resulting in high transmission losses. Improvements in transmissivity have been accomplished by using chiral or cholesteric liquid crystals which have relatively minimal absorptive characteristics. Cholesteric liquid crystals exhibit circular dichroism and can be used to polarize light from a received source, selectively transmitting and reflecting the light, thereby minimizing its attenuation. However, even cholesteric liquid crystals, as conventionally utilized, can involve a transmission loss of at least 50% due to the reflection effects.

The use of phase mirrors and waveplates, interposed between the crystals and the observer to recapture reflected light and to regulate the polarization sense, provides for a zero loss, 100% transmission optical switch. This combination can also be used to provide for a full color selection assembly, which also has the potential for virtually 100% light transmission. Furthermore, since the crystals are optically clear for wavelengths outside of a selected range, 100% of the incident light outside of the narrow spectral range is transmitted. Thus, the transmitted image can be superimposed on an image created by incident light from other sources, having wavelengths outside of the narrow spectral band of a particular crystal.

PRIOR ART

The use of chiral liquid crystals to minimize the attenuation of light in a switchable color filter was described in the patent to Buzak, U.S. Pat. No. 4,726,663, which issued Nov. 14, 1986. That patent described the configuration of an active nematic liquid crystal cell to provide a two-color or three-color switch using cholesteric liquid crystal elements instead of conventional, absorptive polarizers. Although the use of cholesteric liquid crystals was an improvement over conventional absorptive materials, the cholesteric liquid crystal assembly of the Buzak patent still entails a 50% insertion loss. A more detailed discussion of a color selection filter composed of cholesteric liquid crystals is discussed below.

An optical switch using polarizing beam splitters and prisms with a twisted-nematic cell as the active element was described in the patent to Soref, U.S. Pat. No. 4,478,494, which issued Nov. 19, 1981. That patent described an optical switching assembly which divided an incident beam into counter-rotating orthogonally polarized beams and which thereafter recombined the beams. However, the optical switching assembly of Soref, which requires a fiber optic interface, did not provide color selection capability.

SUMMARY OF THE INVENTION

It has been deemed desirable to provide an optical switching assembly featuring high optical transmission and wide dynamic range. Conventional optical switching assemblies typically utilize absorptive color polarizers. Improvements in transmissivity have been accomplished by using cholesteric liquid crystal ("CLC") materials.

CLC materials are known to exhibit "circular dichroism". They are able to discriminate between left hand circularly polarized ("LHCP") light and right hand circularly polarized ("RHCP") light. If unpolarized light is incident upon a CLC element, one sense of circular polarization will be transmitted and the other sense will be reflected. The material is optically clear for wavelengths outside of a selected range, thereby transmitting 100% of incident light outside that range.

A single CLC can then be utilized as a spectral "notch" filter. The CLC will transmit 100% of the light whose wavelength is displaced from a nominal wavelength. Unpolarized light which is close to the nominal wavelength will be "circularly polarized". The CLC, which is characterized by a polarization sense, reflects light of the same polarization. Thus, a right handed CLC ("RHCLC") will reflect RHCPL, and a left handed CLC ("LHCLC") will reflect LHCPL. For a single element then, the CLC will transmit approximately 50% and will reflect approximately 50% of the impinging light at the nominal wavelength and the light whose wavelength is within the narrow band around the nominal wavelength. There are two types of cholesteric liquid crystals known to exhibit circular dichroism. Monomer cholesteric liquid crystals are conventionally used. Polymer cholesteric liquid crystals are in the experimental stages but have exhibited a broader temperature range than the monomers.

Complementary pairs of CLC's (one RHCLC plus one LHCLC), or two like CLC's in combination with a half-wave plate, provide improved notch filters with near-zero transmission in the notch. These can be combined with variable waveplates to create an optical switch or color selection switch as in the Buzak patent, however, the maximum transmissivity is still only 50%. The current invention eliminates this shortcoming by using phase mirrors which capture the reflected light and reorient its polarization sense. The light is then reflected by the mirrors and transmitted through a variable wave plate where it is selectively reoriented and recombined, thus providing a zero loss, 100% transmission optical switch or color selection element.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference numerals refer to like parts throughout and in which:

FIG. 1 is a cross-sectional view of a prior art single cholesteric light crystal element functioning as a spectral notch filter;

FIG. 2 is a graph showing the approximate transmissivity characteristic of the element of FIG. 1 relative to a given nominal wavelength;

FIG. 3 is a cross-sectional view of a prior art spectral notch filter using liquid crystal elements;

FIG. 4 is a cross-sectional view of a prior art spectral notch filter using a pair of same handed cholesteric liquid crystal elements, with a half wave plate between them;

FIG. 5 is a graph showing the approximate transmissivity characteristic of an ideal spectral notch filter;

FIG. 6 is a cross-sectional view of a prior art color selection filter using two pair of cholesteric liquid crystal elements and an active variable retarder element;

FIG. 7 is a cross-sectional view of a monochromatic optical switch according to the present invention;

FIG. 8 is a table displaying the orientation of the monochromatic light beams of FIG. 7, as a function of the state of the variable wave plate;

FIG. 9 is a cross-sectional view of a dichromatic selection assembly according to the present invention;

DESCRIPTION OF THE PREFERRED EMBODIMENTS

Figures 10, 11, 12:
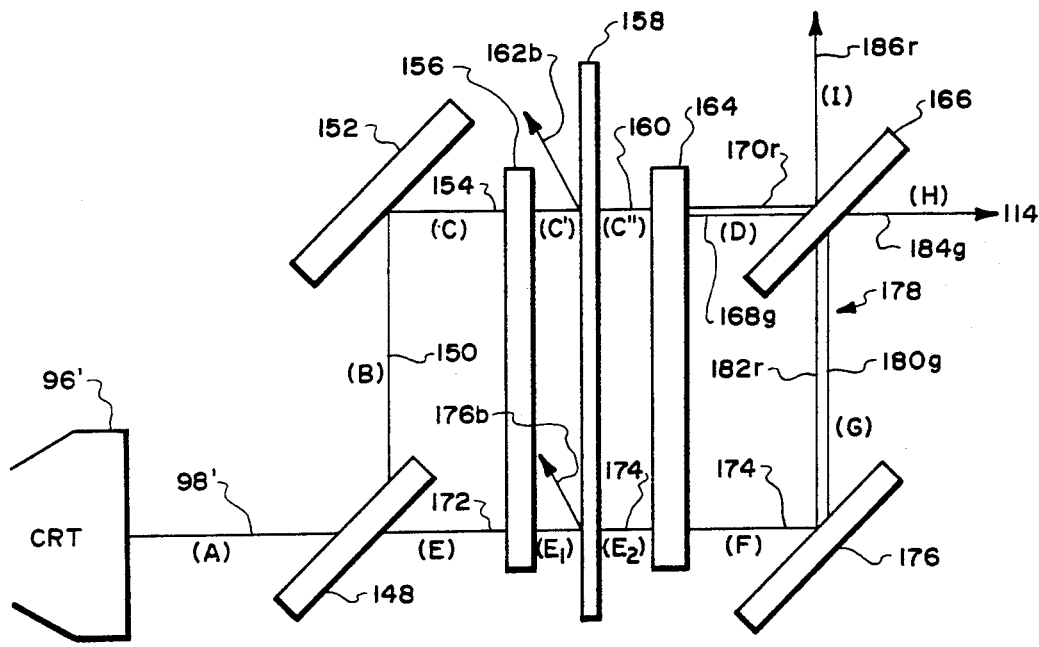
FIG. 10 is a table displaying the orientation of the dichromatic light beams of FIG. 9, as a function of the state of the variable wave plate.
FIG. 11 is a cross-sectional view of a trichromatic selection assembly according to the present invention, in a first state.
FIG. 12 is a table displaying the orientation of the dichromatic light beams of FIG. 11, as a function of the state of the first and second variable wave plates.

Cholesteric Light Crystals exhibit circular dichroism. They are able to discriminate between Left Handed Circularly Polarized Light ("LHCPL") and Right Handed Circularly Polarized Light ("RHCPL"). If unpolarized light is incident upon a Cholesteric Liquid Crystal element, one sense of circular polarization will be transmitted and the other will be totally reflected.

FIG. 1 shows a prior art spectral notch filter 10 composed of a Right Handed Cholesteric Liquid Crystal ("RHCLC") 12. The nominal notch center wavelength ("WL") is a function of the index of refraction of the RHCLC 12 and the period or pitch of the chiral structure. The RHCLC 12 is optically clear to a first beam of incident light 14, whose wavelength is outside the center band of the filter 10.

Accordingly, the first light beam 14 is completely transmitted through RHCLC 12. A second beam of incident light 16, which is at or around wavelength WL and within the center band, is circularly polarized into its component first and second beams 18, 20. First polarized beam 18, which is Right Handed Circularly Polarized Light ("RHCPL"), is almost totally reflected from RHCLC 12. The second polarized beam 20, which is Left Handed Circularly Polarized Light ("LHCPL"), is almost totally transmitted through RHCLC 12. Thus the single RHCLC 12 provides a spectral notch filter 10 which reflects approximately 50% of the incident light at or around wavelength WL, and transmits the remainder of the incident light.

FIG. 2 is a graph showing the relationship between the wavelength of the incident beam and the transmissivity of the light incident on the spectral notch filter 10 of FIG. 1. As shown, the "notch" around the center of the wavelength is distinctive.

An improved prior art spectral notch filter 22 is illustrated in FIG. 3. The improved filter 22 is composed of a Left Handed Cholesteric Liquid Crystal ("LHCLC") 24 and a RHCLC 26, similar to RHCLC 12. The LHCLC 24 transmits incident beam 14a, whose wavelength is outside of the center band and polarizes incident beam 16a, whose wavelength is within the center band or notch, into LHCPL beam 18a and RHCPL beam 20a. LHCPL beam 18a is reflected from LHCLC beam 24 and RHCPL 20a is transmitted through LHCLC 24. The RHCPL beam 20a then impinges upon RHCLC 26 from which it is fully reflected and is transmitted through LHCLC 24.

As an improvement over the spectral notch filter 10 of FIG. 1, the spectral notch filter 22 of FIG. 3 provides for near 100% reflectivity of the incident light which is at or near the wavelength WL, the spectral "notch" of the filter. All light outside the notch is transmitted without change.

A variation of the spectral notch filter 22 of FIG. 3 is illustrated in FIG. 4. The alternative prior art spectral notch filter 30 is composed of two identical CLC's, in this case a pair of LHCLC's, 24a and 24b. A half wave plate 32 is interposed between the LHCLC's 24a and 24b.

Incident light 16b is polarized by the first LHCLC 24a into a primary RHCPL beam 20b and LHCPL beam 18b. The LHCPL beam 18b is reflected by the first LHCLC 24a. The primary RHCPL beam 20b is transmitted by the first LHCLC 24a, converted to a secondary LHCPL beam 34 by the half wave plate 32 which is reflected by the second LHCLC 24b. The secondary LHCPL beam 34 then traverses the half wave plate 32 and is converted to the RHCPL beam 36 which is transmitted by the first LHCLC 24a.

The spectral notch filter 30 of FIG. 4 therefore reflects virtually 100% of the incident light which is within the "notch", at or near the wavelength WL. As before, all illumination outside the center band is transmitted without modification.

FIG. 5 is a graph showing the performance of an ideal prior art spectral notch CLC filter. Nearly all of the light whose wavelength is outside the band whose center is the wavelength WL will be transmitted. As the wavelength of the incident light approaches the band whose center is WL, transmissivity approaches zero. As shown, the transition between transmission and exclusion can be quite abrupt.

In an alternative embodiment, the wave plate 32 of FIG. 4 can be replaced by an active variable retarder element (not shown), such as is taught, for example in the Kalmanash et al U.S. Pat. No. 4,770,500 and assigned to the assignee of the present invention. As the retardation is varied from zero to half-wave, the notch transmission can be dynamically varied from 50% to near zero, creating an optical "switch".

As illustrated in FIG. 6, CLC's in combinations with a variable retarder can be used to make a color selection filter 38, without using absorptive color polarizers. A similar device was shown in Buzak, U.S. Pat. No. 4,726,663. At the bottom of FIG. 6 is a table of the various polarization orientations of the spectral beams at various transmission points within the device.

As shown, the color selection filter 38 is composed of a cathode ray tube ("CRT") 40 as a light source, a series of CLC's, 42, 44, 46 and 48, and a variable retarder, 50. The CRT 40 provides an unpolarized light beam 52 which combines narrow wavelength bands of red light 52r and green light 52g. The unpolarized light beam 52, emitted from the CRT 40 is first incident upon a first RHCLC 42 which is tuned to the red wavelength band of the CRT 40. The red portion of the unpolarized light beam 52r is polarized by the RHCLC 42, transmitting a LHCP red light beam 54r and reflecting a RHCP red light beam 56r. The green portion of the unpolarized light beam 52g is unaffected by the RHCLC 42 and is tranmitted therethrough.

The RHCLC 44 which is tuned to green wavelength band of the CRT 40, polarizes the green portion of the unpolarized light beam 52g, transmitting a LHCP green light beam 58g and reflecting RHCP green light 60g. The LHCP red light beam 54r which is incident on the RHCLC 44 is unaffected by it and is transmitted therethrough. The transmitted beams of LHCP red 54r and LHCP green 58g are acted on by the variable retarder 50. When the variable retarder 50 is in the "ON" state, it functions as a zero-wave retarder and transmits circularly polarized light without change. In the "OFF" state, however, the variable retarder 50 functions as a half-wave retarder and inverts the sense of polarization of the light beams. In this "OFF" configuration, then both the LHCP red light beam 54r and the LHCP green light beam 58g are converted to RHCP light beams.

When the variable retarder 50 is in the "ON" state, the red and green LHCP light beams 54r and 58g are transmitted through a third RHCLC 46, which is tuned to the green wavelength of the CRT, and a first LHCLC 48, which is tuned to the red wavelength of the CRT. The green light beam 58g is transmitted to the observer by the RHCLC 46 and the red light beam 54r is totally reflected by the LHCLC 48, thereby resulting in a green image. Thus, the overall transmission of green light is 50% and the overall transmission of red light is zero.

Conversely, when the variable retarder 50 is in the "OFF" state, RHCP red and green beams, which are depicted as dashed lines 54r' and 58g' respectively, impinge on the RHCLC 46. The RHCP green beam is reflected but the RHCP red beam is transmitted through the LHCLC 48, resulting in a red image at the observer. In this configuration the overall transmission of red light is 50% and the overall transmission of green light is zero.

The prior art assemblies of FIGS. 1, 3, 4, and 6, discussed above as color switches, permit a higher transmission rate than is presently attainable through the utilization of absorptive elements. Nevertheless, these CLC based assemblies still carry a 50% insertion loss due to the initial reflection from the first active CLC surface. The preferred embodiment of the present invention eliminates this shortcoming by capturing the circularly polarized light which is reflected from the first, active CLC element, thus enabling a zero-loss, virtually 100% transmission optical switch or color selection element.

FIG. 7 illustrates the preferred embodiment of the invention as a monochrome optical switch 60. Unpolarized light 62 from source 64, with spectral content concentrated in a defined region around wavelength WL, is transmitted along path A and is incident on a first RHCLC 66. Light beam 62 is polarized into a RHCP light beam 68, which is transmitted along path B, and a LHCP beam 70, which is transmitted along path E. The LHCP light beam 70 is transmitted through a variable wave plate 72. When the variable wave plate 72 is in the "ON" state, there is zero retardation and the LHCP light beam 70 is transmitted unchanged, following path F. LHCP light beam 70 is next incident on a first phase mirror 74, where it undergoes a phase reversal to RHCP light beam 76 and is reflected along path G.

The RHCP light beam 68, along path B, is incident on a second phase mirror 78, where it undergoes a phase reversal and is reflected along path C as a LHCP light beam 80. The LHCP light beam 80 is tranmitted through variable wave plate 72, which is in the "ON" state, where it is transmitted unchanged as a LHCP light beam 80 along path D. The RHCP light beam 76, along path G, and the LHCP light beam 80, along path D, are both incident upon a second RHCLC 82. The RHCP light beam 76 is reflected by the second RHCLC 82 and the LHCP light beam 80 is transmitted through the second RHCLC 82. Both the RHCP light beam 76 and the LHCP light beam 80 are recombined as light beam 84 in the second RHCLC 82 and transmitted to observer 86.

Thus, with the variable wave plate 72 in the "ON" state, the net transmission of light to the observer 86 is 100%. A second observer 86' positioned along the extension of path G would see no light.

When the variable wave plate 72 is set to the "OFF" state there is half-wave retardation. The LHCP light beam 70 passes through the variable wave plate 72 and undergoes a phase reversal and becomes a RHCP light beam 88, denoted by a dashed line. It is then incident upon the first phase mirror 74 where it again undergoes a phase reversal to a LHCP light beam 90 and is reflected along path G to the second RHCLC 84.

The LHCP light beam 80 also undergoes phase reversal through variable wave plate 72, to become a RHCP light beam 92, also denoted by a dashed line, and is transmitted along path D to the second RHCLC 74 where it is reflected. The RHCP light beam 92, which has been reflected by the second RHCLC 82, is recombined with the LHCP light beam 90, which has been transmitted through the second RHCLC 82. Both beams 92 and 90 are transmitted away from the observer 86, resulting in a net zero transmission of light.

In both the "ON" of "OFF" state, the net result is the 100% transmission of light of a particular wavelength and the 100% reflection of light of other wavelengths. Since there is virtually no absorption of light, the optical switch functions as a "light steering device". Thus, with the second observer 86', light of the desired wavelength could alternatively be "steered" between observer 86 and observer 86'.

FIG. 8 is a table illustrating the various polarization orientations of the light beams, depending on the state of the variable wave plate 72, and the resultant transmission percentage at the observer 86.

In an alternative version of the preferred embodiment, the invention can be used to create a color selection device with the same enhancements in transmissivity. FIG. 9-ON illustrates just such a color selection assembly 94. In this particular embodiment, the light source 96 is a CRT which transmits a light beam 98 along path A, which is composed of both red and green light. Light beam 98 is incident upon a first CLC combination 100, which is composed of a green RHCLC and a red RHCLC.

The first CLC combination 100 reflects a red and green RHCP light beam 102 along path B. The RHCP light beam 102 is incident upon a first phase mirror 104 where it undergoes a phase reversal to a LHCP light beam 106 and is reflected along path C. The LHCP light beam 106 passes through a variable wave plate 108, which in this configuration is in the "ON" or zero-wave state. The LHCP light beam 106 beam is transmitted unchanged along path D.

The LHCP light beam 106 is incident upon a second CLC combination 110, which is composed of a green RHCLC and a red LHCLC. The green portion 112g of the LHCP light beam 106 is thereby transmitted to the observer 114 and the red portion 116r of the LHCP light beam 106 is reflected away from the observer 114 toward an alternate observer 114'.

The initial incidence of red and green light 98 upon the first CLC combination 100 also results in the transmission of a red and green LHCP light beam 118, along path E, through the variable wave plate 108, where it is transmitted, unchanged along path F. The LHCP light beam 118 is incident upon a second phase mirror 120 where it undergoes a phase reversal to a RHCP light beam 122 and is reflected along path G. The RHCP light beam 122 is then incident upon second CLC combination 110, where the red portion 124r of the RHCP light beam 122 is recombined with the red portion 116r of the LHCP light beam 106 to form red light beam 126r and transmitted away from the observer 114, along path I, to alternate observer 114'.

The green portion 128g of the RHCP light beam 122 is reflected by the second combined CLC 110, where it is recombined with the green portion 112g of the LHCP light beam 106 to form green light beam 130g along path H and transmitted to the observer 114. Thus the net transmission of green light to observer 114 is 100% and the net transmission of red light is zero. However, the alternate observer 114' "sees" 100% of the red light and no green light.

If the half-wave plate 108 is set to the "OFF" or half-wave state (see FIG. 9-OFF), then the LHCP light beam 106 and the LHCP light beam 118 undergo phase changes and become RHCP light beams. In this configuration, the LHCP light beam 106 undergoes phase reversal and becomes RHCP light beam 130, which is composed of red light beam 132r and green light beam 134g, and is transmitted along path D. The RHCP light beam 130 is then incident upon the second combined CLC 110, where the red portion 132r of the RHCP light beam 130 is transmitted to from the observer 114 and the green portion 134g of the RHCP light beam 130 is reflected away from observer 114, The LHCP light beam 118 also undergoes phase reversal to become RHCP light beam 136 and is transmitted along path F. The RHCP light beam 136 is incident upon second phase mirror 120, where it undergoes another phase reversal to become LHCP light beam 138 and is reflected along path G.

LHCP light beam 138 is incident upon the second combined CLC 110, where the red portion 140r of the LHCP light beam 138 is reflected and recombined with red light beam 132r to form red light beam 142r, along path H, and transmitted to the observer 114. The green portion 144g of the LHCP light beam 138 is transmitted through the second combined CLC 110, where it is recombined with green light beam 134g to form green light beam 146g and is transmitted away from the observer 114, along path I, to the alternate observer 114'. Thus, to the observer 114, the net transmission of red light is 100% and the net transmission of green light is zero, while the alternate observer 114' "sees" 100% of the green light and none of the red light.

FIG. 10 is a table illustrating the various polarization orientations of the light beams, depending on the state of the variable wave plate 108, and the resultant transmission percentage at the observer 114. As is evident, either color can be selected for a zero-loss, net transmission of 100% of the initial incident beam.

Again, since there is virtually no absorption of light, the color selection switch functions as a "color steering device". Since there is 100% transmission of light of a particular wavelength and 100% reflection of light of a second wavelength, light of the first wavelength could alternatively be "steered" between observer 114 and observer 114'. Conversely, light of the second wavelength would be "steered" between observer 114' and 114, respectively.

Furthermore, the near clarity of the CLC's provides for near 100% transmission of light having wavelengths other than the first or second wavelength, which in the above example would be colors other than red or green. Thus, an image composed of these alternative wavelengths, and arriving from another source, could be transmitted through the last CLC combination 110 and be superimposed upon the transmitted image 130g or 142r. Even if the image from another source had components within the first and second wavelengths, the combined CLC 110 would still transmit 50% of the light composed of the first and second wavelengths.

Figures 13, 14:
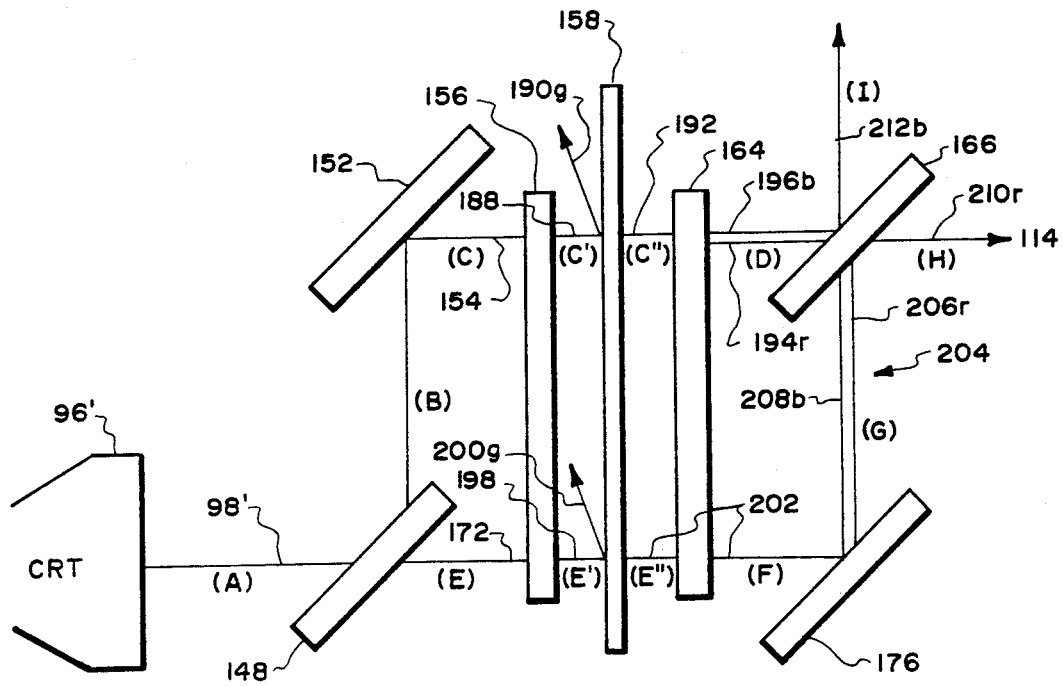
FIG. 13 is a cross-sectional view of the trichromatic selection assembly of FIG. 11, in a second state.
FIG. 14 is a table displaying the orientation of the dichromatic light beams of FIG. 13, as a function of the state of the first and second variable wave plates.
Figures 15, 16:
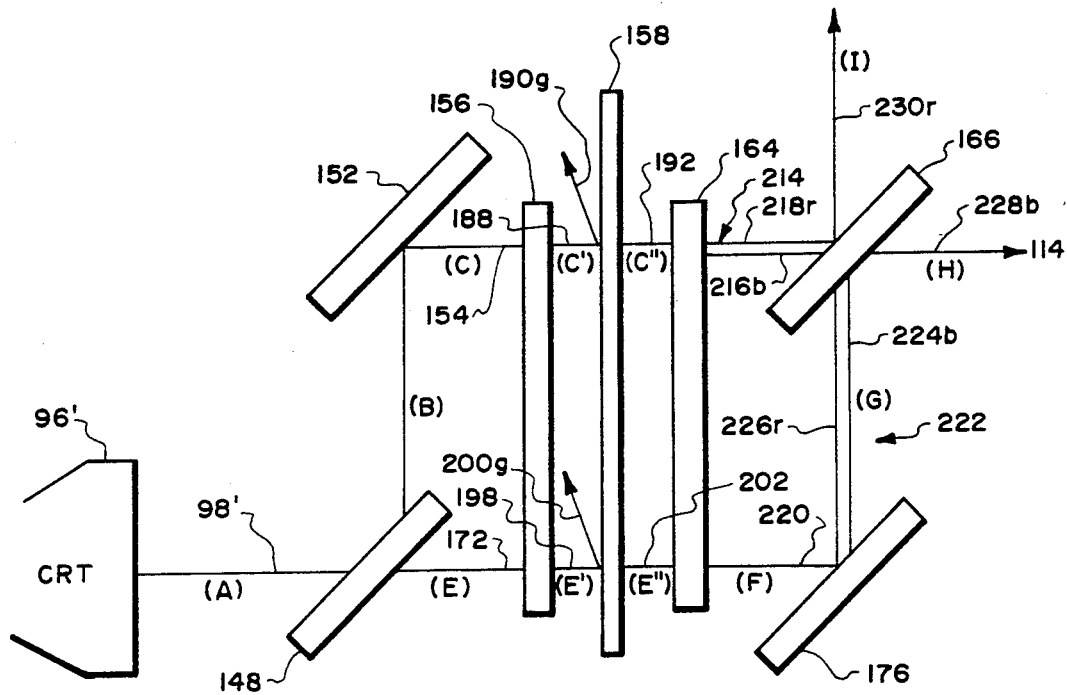
FIG. 15 is a cross-sectional view of the trichromatic selection assembly of FIG. 11, in a third state.
FIG. 16 is a table displaying the orientation of the dichromatic light beams of FIG. 15, as a function of the state of the first and second variable wave plates.

The use of the foregoing assembly is readily extendible to a three color selection switch, as illustrated in FIGS. 11, 13, and 15. In FIG. 11, a three color selection assembly is illustrated wherein a light source 96' is a CRT which transmits a light beam 98' which is composed of red, green and blue light. Light beam 98' is incident upon a first CLC combination 148 which is composed of a red RHCLC, a green RHCLC and a blue RHCLC.

The first CLC combination 148 reflects a red, green and blue right handed light beam 150 along path B. The RHCP light beam 150 is incident upon a first phase mirror 152 where it undergoes a phase reversal to LHCP light beam 154 and is reflected along path C. LHCP light beam 154 is incident upon a first variable wave plate 156, which is in the ON state, where it is transmitted unchanged along path C'. LHCP light beam 154 is then incident upon a second CLC combination 158, which is composed of a blue LHCLC and a green RHCLC. The red and green portions of the LHCP light beam 154 are transmitted through the second CLC combination 156 along path C" as light beam 160.

The blue portion of the LHCP light beam 154 is reflected by the blue LHCLC of the second CLC combination 158 as light beam 162b. Note that the angle of reflection of light beam 162b is acutely drawn for ease of reference only. In fact, light beam 162b would be reflected back from the second CLC combination 158 at an angle equal to its angle of incidence. Given the assembly as illustrated, light beam 162b would be reflected by both phase mirror 152 and first CLC combination 148 back to CRT 96'.

LHCP light beam 160, composed of red and green LHCP light, is then incident upon a second variable wave plate 164, which is also in the ON state, and is transmitted unchanged along path D. The LHCP light beam 160 is incident upon a third CLC combination 166, composed of a red LHCLC, a green RHCLC and a blue RHCLC. The green portion 168g of the light beam 160 is transmitted through the third CLC combination 166 to observer 114. The red portion 170r of the light beam 160, is reflected by the red LHCLC away from primary observer 114 to the alternate observer 114'.

The initial incidence of red, green and blue light upon first CLC combination 148 also results in the transmission of red, green and blue LHCP light beam 172 along path E, through the first variable wave plate 156, where it is transmitted unchanged along path E'. LHCP light beam 172 is then incident upon the second CLC combination 158 where the red and green portions of light beam 172 are transmitted along path E'' as light beam 174.

Once again, the blue portion of light beam 172 is reflected by the second CLC combination, this time as light beam 176b. Again the angle of reflection is acutely drawn for ease of reference when in fact light beam 176b will also be reflected back to CRT 96' where it will be recombined with light beam 162b.

Light beam 174, composed of red and green LHCP, is incident upon the second variable wave plate 164 where it is transmitted unchanged along path F and is incident upon a second phase mirror 176, where it is converted to RHCP light beam 178 and is transmitted along path G. RHCP light beam 178 is incident upon third CLC combination 166 where the green portion 180g is reflected along path H and recombined with 168g to form green light beam 184g and transmitted to observer 114. The red portion 182r of light beam 178 is transmitted through the third CLC combination 166, where it is recombined with light beam 170r to form red light beam 186r and transmitted along path I to alternate observer 114'.

Thus, to the observer 114, the net transmission of green light is 100% and the net transmission of red light is zero, while the alternate observer 114' "sees" 100% of the red light and none of the green light. From an initial transmission of red, green and blue light we have "steered" blue light back to its source, green light to observer 114 and red light to observer 114', all with virtually no absorption loss. Again, an image composed of alternative wavelengths, and arriving from another source, could be transmitted through the last CLC combination 166 and be superimposed upon the transmitted images 184g or 186r.

FIG. 12 is a table illustrating the various polarization orientations of the light beams further determined by the configurations of the variable wave plates 156 and 164 as indicated in FIG. 11. In this configuration green is selected for a zero-loss, net transmission of 100% of the initial incident beam to the observer 114.

Alternative color selections can be accomplished effected by varying the state of either or both of the variable wave plates 156 and 164, as illustrated in FIGS. 13 and 15. In FIG. 11, both wave plates 156 and 164 were in the ON state, resulting in transmission of green light 184g to observer 114 and red light 186r to observer 114'.

In FIG. 13, the first wave plate 156 is in the ON state and the second wave plate 164 is in the OFF state. Thus, LHCP light beam 154 passes through the first wave plate 156 and is converted to RHCP light beam 188 and transmitted along path C'. RHCP light beam 188 is transmitted through the second CLC combination 158, where green RHCP light beam 190g is reflected and light beam 192, composed of red and blue RHCP light, is transmitted along path C''. RHCP light beam 192 is transmitted through the second wave plate 164 and is transmitted unchanged along path D and is incident upon the third CLC combination 166. The red portion 194r of RHCP light beam 192 is transmitted along path H to observer 114 and the blue portion 196b of RHCP light beam 192 is reflected along path I to observer 114'.

The LHCP light beam 172 passes through the first wave plate 156 and is converted to RHCP light beam 198 and transmitted along path E'. RHCP light beam 198 is transmitted through the second CLC combination 158, where green RHCP light beam 200g is reflected and light beam 202, composed of red and blue RHCP light, is transmitted along path E''. RHCP light beam 202 is transmitted unchanged through the second wave plate 164 and is incident upon the second phase mirror 176, where it is converted to LHCP light beam 204 and reflected along path G and it is incident upon the third CLC combination 166. The red portion 206r of LHCP light beam 204 is reflected along path H where it is recombined with red light beam 194r to become 210r and transmitted to observer 114. The blue portion 208b of LHCP light beam 204 is transmitted along path I where it is recombined with blue light beam 196b to become blue light beam 212b and transmitted to observer 114'. Thus, we have steered nearly 100% of the red light to observer 114 and nearly 100% of the blue light to observer 114'. Again the unwanted color, in this case green, has been nearly wholly reflected back to CRT 96'.

FIG. 14 is a table illustrating the various polarization orientations of the light beams further determined by the configurations of the variable wave plates 156 and 164 as indicated in FIG. 13. In this configuration red is selected for a zero-loss, net transmission of 100% of the initial incident beam to the observer 114.

In yet another configuration, that of FIG. 15, we are able to select the blue color and send it to observer 114 and send red to observer 114'. This is accomplished by placing both the first wave plate 156 and the second wave plate 164 in the OFF state. In this configuration, LHCP light beam 154 passes through the first wave plate 156 and is again converted to RHCP light beam 188 and transmitted along path C'. RHCP light beam 188 is transmitted through the second CLC combination 158, where green RHCP light beam 190g is reflected and light beam 192, composed of red and blue RHCP light, is transmitted along path C''. RHCP light beam 192 is transmitted through the second wave plate 164 where this time it is converted to LHCP light beam 214 and transmitted along path D. LHCP light beam 214 is incident upon the third CLC combination 166 where the blue portion 216b of LHCP light beam 214 is transmitted along path H to observer 114 and the red portion 218r of LHCP light beam 214 is reflected along path I to observer 114'.

The LHCP light beam 172 passes through the first wave plate 156 and is again converted to RHCP light beam 198 and transmitted along path E'. RHCP light beam 198 is again transmitted through the second CLC combination 158, where green RHCP light beam 200g is reflected and light beam 202, composed of red and blue RHCP light, is transmitted along path E''. RHCP light beam 202 is transmitted through the second wave plate 164 where it is converted to LHCP light beam 220 and is incident upon the second phase mirror 176, where it is converted to RHCP light beam 222 and reflected along path G. RHCP light beam 222 is incident upon the third CLC combination 166 where the blue portion 224b of RHCP light beam 222 is transmitted along path H where it is recombined with blue light beam 216b to become 228b and transmitted to observer 114. The red portion 226r of RHCP light beam 222 is transmitted along path I where it is recombined with blue light beam 218r to become red light beam 230r and transmitted to observer 114'. In this configuration, we have steered nearly 100% of the blue light to observer 114 and nearly 100% of the red light to observer 114'. Again the unwanted color, green, has been nearly wholly reflected back to CRT 96'.

FIG. 16 is a table illustrating the various polarization orientations of the light beams further determined by the configurations of the variable wave plates 156 and 164 as indicated in FIG. 15. In this configuration blue is selected for a zero-loss, net transmission of 100% of the initial incident beam to the observer 114.

In yet another configuration of the three color selection assembly, red is again transmitted to the observer 114, with green being sent to the alternate observer 114'. This is accomplished by placing the first wave plate 156 in the ON state and the second wave plate 164 in the OFF state, the converse of the configuration of FIG. 14. In this configuration, it is the blue light that is reflected by the second CLC combination 158, and the green light that is transmitted, ultimately, to the alternate observer 114'.

In summation, the three color selection assembly of FIGS. 11, 13 and 15, provide for the choice of two colors from an initial incident beam composed of three colors. If both variable wave plates are in the ON state, then green light is transmitted to observer 114. If both variable wave plates are in the OFF state, then blue light is transmitted to observer 114. Finally, if the variable wave plates are in different states from each other, then red light is transmitted to observer 114. In the latter instance, the selection of color sent to the alternate observer 114' is determined by which variable wave plate is in the ON state.

By varying the "tuning" of the CLC combinations and by altering the states of the variable wave plates, various permutations and combinations of color selection can be accomplished, in addition to those discussed above, resulting in a virtual palette of colors available for display. The uses of the foregoing assemblies are thus extendible to a multi-color operation that is suitable for use with any color light source.

Moreover, while monomer cholesteric liquid crystals have been employed in these embodiments, it is believed that polymer cholesteric liquid crystals, which are much more insensitive to temperature variations, would be preferable in those applications where the temperature cannot be closely controlled. The present embodiments of this invention are thus to be considered in all respects as illustrative and not restrictive; the scope of invention being indicated by the appended claims rather than the foregoing description. All changes which come within the meaning and range of equivalency of the claims are intended to be embraced therein.

What is claimed is:

1. An apparatus for providing optical switching of a nonpolarized beam of light by an observer comprising:
   (a) first beam separating means adapted to receive the beam of light, for transmitting a first portion of said light beam having a first polarization orientation and for reflecting a second portion of said light beam having a second polarization orientation;
   (b) first wave orientation reversal means in optical communication with said first beam separating means, for reversing the orientation of and reflecting said reflected second portion of said light beam;
   (c) variable wave retardation means, adapted for receiving and transmitting light from both said first beam separating means and from said first wave orientation reversal means, for selectively retarding the polarization orientation of light transmitted therethrough;
   (d) second wave orientation reversal means in the path of said first light beam portion for reversing the orientation of light transmitted through said variable wave retardation means and for reflecting said first light beam portion;
   (e) second beam separating means adapted for receiving said first and second light beam portions from said second wave orientation reversal means and said variable wave retardation means, respectively, and further adapted for transmitting those light beam portions having said first orientation and for reflecting those light beam portions having said second orientation.

2. The apparatus of claim 1, further including controlling means operatively coupled to said variable wave retardation means adapted for use by the observer to selectively retard the polarization orientation of light transmitted through said variable wave retardation means.

3. The apparatus of claim 1, wherein said first and said second beam separating means are polarizing notch filters adapted for reflecting light of a chosen wavelength and orientation and for transmitting all other beams of light.

4. The apparatus of claim 3, wherein said polarizing notch filters means are further adapted for selectively transmitting and reflecting light of at least one chosen wavelength and at least one chosen orientation.

5. The apparatus of claim 3, wherein said wavelengths are within the visible spectrum.

6. The apparatus of claim 1, wherein the first and second beam separating means include cholesteric liquid crystals.

7. The apparatus of claim 6, wherein said cholesteric liquid crystals include monomer cholesteric liquid crystals.

8. The apparatus of claim 6, wherein said cholesteric liquid crystals include polymer cholesteric liquid crystals.

9. The apparatus of claim 1, wherein said first and second wave phase reversal means include mirrors.

10. An apparatus for providing wavelength selection of a nonpolarized beam of light of more than one wavelength by an observer comprising:
   (a) first beam separating means adapted to receive the beam of light, for transmitting a first light beam portion having a first polarization orientation and for reflecting a second light beam portion having a second polarization orientation;
   (b) first wave orientation reversal means in optical communication with said first beam separating means, for reversing the orientation of and reflecting said second light beam portion;
   (c) variable wave retardation means adapted for receiving and transmitting said first and second light beam portions, and for selectively retarding the polarization orientation of said light beam portions transmitted therethrough;
   (d) second wave orientation reversal means in the path of said first light beam portion for reversing the orientation of said first light beam portion transmitted through said variable wave retardation means and for reflecting said first light beam portion;

(e) second beam separating means adapted for receiving said first and second light beam portions and for transmitting those light beam portions having a selected wavelength and orientation combination and for reflecting those nonselected wavelength and orientation combinations.

11. The apparatus of claim 10, further including controlling means adapted for use by the observer to selectively retard the polarization orientation of light transmitted through said variable wave retardation means.

12. The apparatus of claim 10, wherein said first and said second beam separating means include polarizing notch filters adapted for reflecting light beams of a chosen wavelength and orientation and for transmitting all other beams of light.

13. The apparatus of claim 12, wherein said first and second beam separating means are further adapted for selectively transmitting and reflecting light beams of at least one chosen wavelength and at least one chosen orientation.

14. The apparatus of claim 10, further including a third beam separating means operatively connected to said variable wave retardation means and adapted for reflecting light of a chosen wavelength and orientation and for transmitting all other beams of light.

15. The apparatus of claim 10, further including a second wave retardation means operatively connected to said first variable wave retardation means and adapted for selectively retarding the polarization orientation of said portions of light transmitted therethrough.

16. The apparatus of claim 10, wherein said wavelengths correspond to visible light.

17. The apparatus of claim 10 wherein the first and second beam separating means include cholesteric liquid crystals.

18. The apparatus of claim 17, wherein said cholesteric liquid crystals include monomer cholesteric liquid crystals.

19. The apparatus of claim 17, wherein said cholesteric liquid crystals include polymer cholesteric liquid crystals.

20. The apparatus of claim 10 wherein said first and second wave orientation reversal means include mirrors.

21. The apparatus of claim 10, wherein said first beam separating means is a combination of cholesteric liquid crystals adapted to selectively reflect and transmit wavelengths of light based upon their given orientations.

22. The apparatus of claim 10, wherein said second beam separating means is a combination of cholesteric liquid crystals adapted to selectively reflect and transmit wavelengths of light based upon their given orientations.

23. An apparatus for providing wavelength selection of a nonpolarized beam of light of more than one wavelength by an observer comprising:

(a) first cholesteric liquid crystal combination adapted to receive the beam of light, for reflecting a first light beam portion of a chosen polarization orientation and for transmitting a second light beam portion composed of all other polarization orientations;

(b) first mirror in optical communication with said first cholesteric liquid crystal combination, for reversing the orientation of and reflecting said first light beam portion;

(c) first variable wave retardation means adapted for receiving said first and second light beam portions and for selectively retarding the polarization orientation of said light beam portions transmitted therethrough;

(d) second cholesteric liquid crystal combination in optical communication with said first variable wave retardation means and adapted for receiving said first and said second light beam portions transmitted through said first variable wave retardation means, for reflecting portions of said first and second light beam portions of a chosen orientation and for tranmitting other selected portions of said first and second light beam portions composed of all other orientations;

(e) second variable wave retardation means in optical communication with said second cholesteric liquid crystal combination adapted for receiving said selected portions of light transmitted through said second cholesteric liquid crystal combination, and for selectively retarding the polarization orientation of said selected portions of light;

(f) controlling means adapted for use by the observer to selectively retard the polarization orientation of light transmitted through said first and said second variable wave retardation means;

(g) second mirror in optical communication with said second variable wave retardation means adapted for reversing the orientation of said selected portion of said second light beam portion transmitted through said variable wave retardation means and for reflecting said selected portion of light;

(h) third cholestereic liquid crystal combination adapted for receiving said selected portions of said first and said second light beam portions and for transmitting those selected portions of light having a selected wavelength and orientation combination and for reflecting those nonselected wavelength and orientation combinations.

* * * * *